(12) United States Patent
Allen et al.

(10) Patent No.: US 8,019,864 B2
(45) Date of Patent: Sep. 13, 2011

(54) USING TRANSPORT-INDEPENDENT RESOURCE STATUS

(75) Inventors: Nicholas A. Allen, Redmond, WA (US); Stephen J. Maine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 158 days.

(21) Appl. No.: 12/487,900

(22) Filed: Jun. 19, 2009

(65) Prior Publication Data

US 2010/0325262 A1 Dec. 23, 2010

(51) Int. Cl.
*G06F 15/16* (2006.01)
(52) U.S. Cl. ...................................... 709/224
(58) Field of Classification Search .................. None
See application file for complete search history.

(56) References Cited

U.S. PATENT DOCUMENTS

| | | | |
|---|---|---|---|
| 7,287,076 B2 | 10/2007 | Ewanchuk et al. | |
| 2003/0101284 A1 | 5/2003 | Cabrera et al. | |
| 2004/0205144 A1* | 10/2004 | Otake | 709/208 |
| 2005/0182843 A1 | 8/2005 | Reistad et al. | |
| 2007/0067479 A1 | 3/2007 | Angelov | |
| 2008/0240086 A1 | 10/2008 | Bouckaert et al. | |
| 2009/0282255 A1* | 11/2009 | Sherkin et al. | 713/176 |
| 2010/0049846 A1* | 2/2010 | Ballette et al. | 709/224 |

OTHER PUBLICATIONS

VSI The leader in Integrated Fax, "XML-F Preliminary Specification Rev. 0.1", Aug. 1998 23 pages.
Daboo C., et al., "Scheduling Extensions to CaIDAV", May 2005, 25 pages.
Ueda, Shigeru, et al., High Performance Transport (HPT), Sep. 15, 1997, 10 pages.
Brainbell, "Status Codes", Based on information and belief available, at least as early as Mar. 31, 2009, 2 pages.

* cited by examiner

*Primary Examiner* — Ario Etienne
*Assistant Examiner* — Clayton R Williams
(74) *Attorney, Agent, or Firm* — Workman Nydegger (57) ABSTRACT

The present invention extends to methods, systems, and computer program products for using transport-independent resource status. Embodiments of the invention provide a mechanism for implementing a new protocol for performing resource request status updates that maintains the benefits of existing protocol (e.g., HTTP) conventions while being usable with arbitrary transport protocols. Additionally, the new protocol works with a variety of different message exchange patterns. The use of the protocol can be hidden behind a programming model that normalizes transport-specific resource status protocols, such as, for example, HTTP, with transport-independent resource status protocols, such as, for example, with a SOAP binding of the described protocol. As such, embodiments of the invention provide resource status updates over an arbitrary network transport protocol whose format and message exchange pattern is decoupled from the definition of the application.

20 Claims, 2 Drawing Sheets

USING TRANSPORT-INDEPENDENT RESOURCE STATUS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

HyperText Transfer Protocol (HTTP) is a request/reply protocol commonly used on the Internet. Communication via HTTP typically includes a requesting computer system (e.g., a client) sending a request to a responding computer system (e.g., a server) for data. For example, a Web browser can send an HTTP request for content to a Web server. The responding computer system accesses the requested data and returns the requested data to the computer system in a corresponding response. For example, the Web server can return requested content to the Web browser in an HTTP response.

HTTP has a relatively rich set of conventions for error communication about resource requests. When a request cannot be satisfied, error information can be returned with respect to any errors that occurred (e.g., client error status codes 4xx and server error status codes 5xx). The error information can indicate the source of the error and what action, if any, can be taken to remediate the error. However, the conventions for error communication are inherently tied to the HTTP communication medium and protocol. Thus, these conventions are not portable. Accordingly, application developers must choose to bind their applications to HTTP or select other protocols that may have a different set of conventions.

BRIEF SUMMARY

The present invention extends to methods, systems, and computer program products for using transport-independent resource status. A client application at a client computer system sends a request to a service application at a server computer system. A client network transport forwards the request from the client computer system to a server computer system via a first communication medium.

A service network transport at the server computer system receives the request from the client application via the first communication medium. A service dispatcher dispatches the request to the service application. The service application generates an application response and one or more events in response to receiving the request. The application response includes application data.

The service application sends the application response to the client application. The service dispatcher intercepts the application response. The service dispatcher constructs a transport-independent status for the application response based on an analysis of the application data and the one or more events. A service status processor formulates protocol specific status renderings from the transport-independent status. The protocol specific status renderings including status indicators for a plurality of different protocol layers of a second (possibly different) communication medium from the service computer system to the client computer system.

The server network transport sends the response from the server computer system to the client computer system via the second communication medium. The response includes the application data and the protocol specific status renderings. Accordingly, the transport-independent status of the response can be indicated, at least to some extent, at each of the plurality of different protocol layers used by the second communication medium.

The client network transport receives the response from the server computer system via the second communication medium. The protocol specific status renderings include status indicators for a plurality of different protocol layers used by the second communication medium to communicate the response from the server computer system to the client computer system. A client status processor synthesizes a single status response from the protocol specific status rendering.

The single status response indicates an error condition with respect to the processing of the request at the server computer system. The client status processor automatically performs one or more remedial actions to compensate for the error condition subsequent to synthesizing the single status response. Thus, further manually entered actions at the client application are reduced.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for using transport-independent resource status. A client application at a client computer system sends a request to a service application at a server computer system. A client network transport forwards the request from the client computer system to a server computer system via a first communication medium.

A service network transport at the server computer system receives the request from the client application via the first communication medium. A service dispatcher dispatches the request to the service application. The service application generates an application response and one or more events in response to receiving the request. The application response includes application data.

The service application sends the application response to the client application. The service dispatcher intercepts the application response. The service dispatcher constructs a transport-independent status for the application response based on an analysis of the application data and the one or more events. A service status processor formulates protocol specific status renderings from the transport-independent status. The protocol specific status renderings include status indicators for a plurality of different protocol layers of a second (possibly different) communication medium from the service computer system to the client computer system.

The server network transport sends the response from the server computer system to the client computer system via the second communication medium. The response includes the application data and the protocol specific status renderings. Accordingly, the transport-independent status of the response can be indicated, at least to some extent, at each of the plurality of different protocol layers used by the second communication medium.

The client network transport receives the response from the server computer system via the second communication medium. The protocol specific status renderings including status indicators for a plurality of different protocol layers used by the second communication medium to communicate the response from the server computer system to the client computer system. A client status processor synthesizes a single status response from the protocol specific status rendering.

The single status response indicates an error condition with respect to the processing of the request at the server computer system. The client status processor automatically performs one or more remedial actions to compensate for the error condition subsequent to synthesizing the single status response. Thus, further manually entered actions at the client application are reduced.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
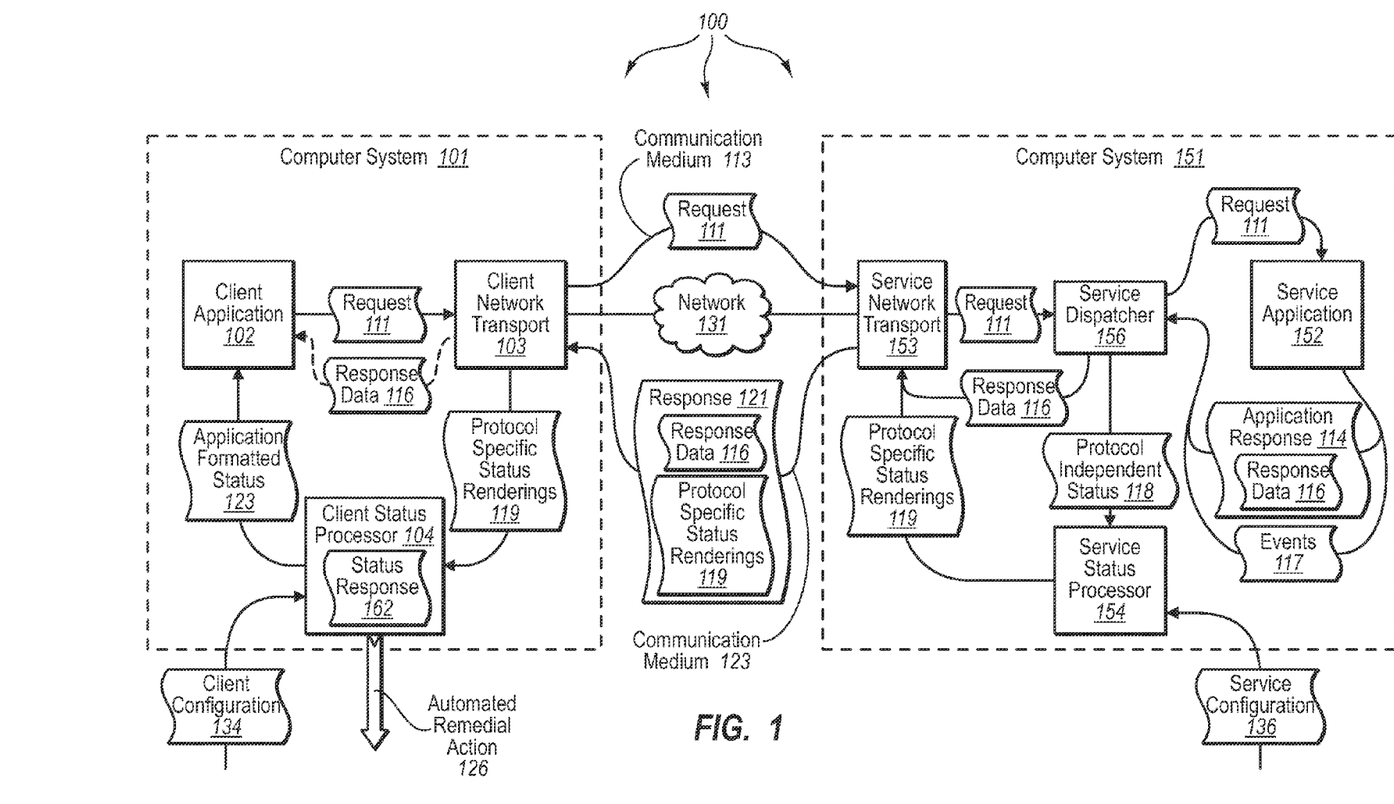
FIG. 1 illustrates an example computer architecture that facilitates using resource-independent status.

FIG. 1 illustrates an example computer architecture 100 that facilitates using transport-independent resource status.

Referring to FIG. 1, computer architecture 100 includes computer system 101, network 131, and computer system 151. Thus, computer systems 101 and 151 are connected to one another over (or are part of) network 131, such as, for example, a Local Area Network ("LAN"), a Wide Area Network ("WAN"), and even the Internet. Accordingly, computer systems 101 and 151 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), User Dataram Protocol ("UDP"), etc.) over network 131.

As depicted, computer system 101 includes client application 102, client network transport 103, and client status processor 104. Client application 102 is configured to perform application-specific functions that formulate a request directed at a particular service. The request may be formulated as a method request, such as, for example, a Remote Procedure Call ("RPC") service, or as a resource request, such as, for example, a Representational State Transfer ("REST") service. Client application 102 can provide requests to client network transport 103.

Client network transport 103 is configured to transport requests over one of one or more outbound communication mediums to reach the particular service. Client network transport 103 is also configured to receive corresponding responses over one of one or more inbound communication mediums. The inbound and outbound communication mediums at client network transport 103 may be the same. For example, a single TCP connection can be shared for an outbound request and an inbound reply. Alternately, the inbound and outbound communication mediums at client network transport 103 may differ. For example, a pair of queues may be established in which messages have additional correlation information to associate the request and the response.

The message exchange patterns for inbound and outbound communication mediums at client network transport 103 can also differ. Message exchanges patterns include, for example, half duplex (i.e., request-reply), full duplex, and correlated simplex messaging. For example, a request may be sent over a half-duplex (request-reply) communication medium and the response received over a correlated simplex (e.g., one-way) communication medium.

Upon receiving a response, client network transport 103 directs at least a status portion of the response to client status processor 104. Client status processor 104 is configured to inspect the response to extract transport-specific status information, such as protocol headers, as well as at least a portion of the status that was rendered in a transport-independent fashion. Client status processor 104 can then synthesize a single status response. The single status response can indicate one or more of: whether an error has occurred; the nature or kind of the error; the party responsible for causing the error; suggested remediating actions that may fix the error; user friendly expressions for indicating the error; and diagnostic or tracking information about the application system or request that led to the error.

Client status processor 104 can determine remediating actions that may be taken in response to an error status. For example, client status processor 104 may determine that a status response indicates a server problem that is to be corrected. Accordingly, client status processor 104 can determine that a remediating action is to try the request again at a later time. Client status processor 104 can consult a client configuration (e.g., client configuration 134) to provide additional information about the status. For example, client status processor 104 may consult a client configuration of translated status strings to localize the user friendly expression for indicating the error into the user interface language of the client.

Client status processor 104 can automatically perform one or more remediating actions in an attempt to correct errors indicated by a status response. These remediating actions may lead to the generation of new requests and new status responses. For example, client status processor 104 can perform a remediating action of re-sending a request. As a result of remediating actions, a corresponding status response can transition from an error status response to a success status response or possibly to a different error status response. Client status processor 104 can also maintain all of the status responses as an aggregate status response or possibly only the most recent status response.

Client status processor 104 is also configured to direct the status response in an application compatible format to client application 102 in an appropriate application-specific format. For example, client status processor 104 can determine that the status response indicates "client provided an invalid request due to missing authorization data" and translate this response into an application-specific security exception.

As depicted, computer system 151 includes service network transport 153, service dispatcher 156, service application 152, and service status processor 154. Service network transport 153 is configured to receive client requests over one of one or more inbound communication mediums. For example, service network transport 153 can receive a request formulated as an RPC service request or a REST service request. Service network transport 153 provides requests to service dispatcher 156.

Service dispatcher 156 is configured to direct requests to the service application or resource identified in the request. The service application resource or method then performs the request in an application-specific fashion. For example, service dispatcher 156 can direct a method request to service application 152. Service application 152 can then perform the requested method in an application-specific fashion.

Generally, service applications can generate application responses and corresponding events as a result of performing requested actions. Service applications can direct an application response back to the client application that sent the request. For example, service application 152 can send an application response back to client application 102. However, service dispatcher 156 is configured to intercept application responses and corresponding events.

Service dispatcher 156 is configured to examine intercepted application responses and events raised by service application 152 to determine the status of a corresponding request. The status determination may be based on direct input by the service application 152. For example, service application 152 may provide service dispatcher 156 with an explicit status response. Alternatively, the status determination may be based on indirect input by service application 152. For example, service application 152 may terminate with an application-specific exception that service dispatcher 156 translates into a status response.

An example of an application-specific exception is a security exception, which service dispatcher 156 may translate into a status of "client provided an invalid request due to missing authorization data". Another example of an application-specific exception is an out of memory exception, which service dispatcher 156 may translate into a status of "service did not have the resources to complete this request, try again later". Service dispatcher 156 formulates the status in a transport-independent fashion. The status can indicate: whether an error has occurred; the nature or kind of the error; the party responsible for causing the error; suggested remediating actions that may fix the error; user friendly expressions for indicating the error; and diagnostic or tracking information about the application system or request that led to the error.

Service dispatcher 156 directs the transport-independent status to service status processor 154. Service status processor 154 renders the transport-independent status in a transport-specific fashion according to the configuration of service network transport 153. For example, service status processor 154 may translate a portion of the transport-independent status to transport-specific protocol headers, such as one or more of HTTP, TCP, etc. At least a portion of the status is rendered in a transport-independent fashion to be communicated in the response. Service status processor 154 may consult existing resources, such as, a service configuration (e.g., service configuration 136) for formulating status responses. For example, service status processor 154 may consult a service configuration of user-friendly Hypertext Markup Language ("HTML") pages created for HTTP status responses and use content from that service configuration to construct some of the transport-independent portion of the response.

Service status processor 154 directs the status response to service network transport 153. Service network transport 153 transmits the response over one of the one or more outbound communication mediums. The outbound communication medium at service network transport 153 may be the same as the inbound communication medium. For example, a single TCP connection may be shared for an inbound request and outbound reply. Alternatively, the outbound communication medium at service network transport 153 may be different than the inbound communication medium. For example, a pair of queues may be established in which messages must have additional correlation information to associate the request and response.

The message exchange patterns for inbound and outbound communication mediums at service network transport 153 can also differ. Message exchanges patterns include, for example, half duplex (i.e., request-reply), full duplex, and correlated simplex messaging. For example, a request may be sent over a half-duplex (request-reply) communication medium and the response received over a correlated simplex (e.g., one-way) communication medium.

Figure 2:
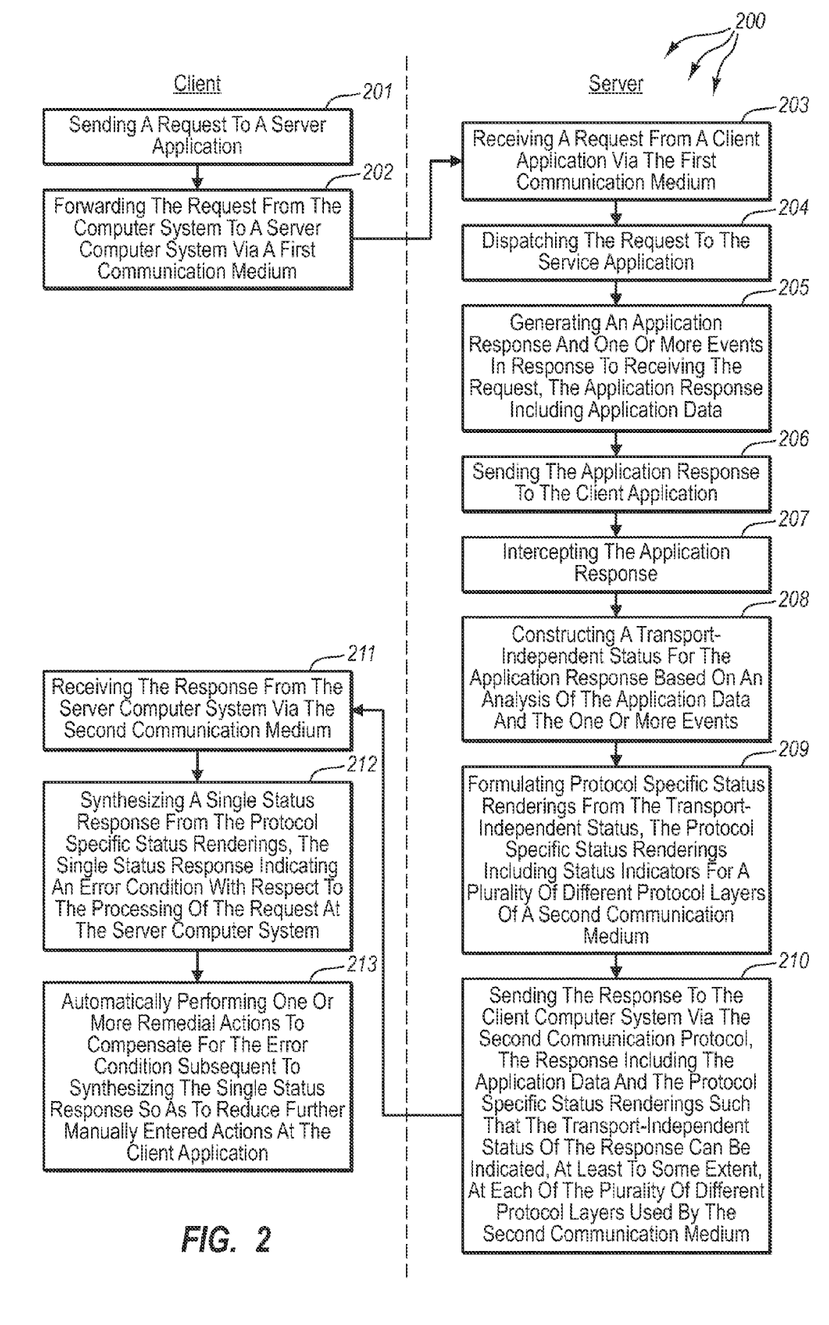
FIG. 2 illustrates a flow chart of an example method for using resource-independent status.

FIG. 2 illustrates a flow chart of an example method 200 for using resource-independent status. Method 200 will be described with respect to the components and data of computer architecture 100.

Method 200 includes an act of sending a request to a server application (act 201). For example, client application 102 can send request 111 (e.g., an RPC or REST request) to service application 152. Method 200 includes an act of forwarding the request to a server computer system via a first communication medium (act 202). For example, request 111 can be sent from client application 102 to client network transport 103. Client network transport 103 can then send request 111 to computer system 151 via communication medium 113. Communication medium 113 can utilize any combination of a variety of different protocols, such as, for example, IP, TCP, UDP, HTTP, Hypertext Transfer Protocol over TLS ("HTTPS"), Simple Object Access Protocol ("SOAP"), etc., arranged in a protocol stack. Communication medium 113 can also utilize any of a variety of different message exchange patterns including, for example, half duplex, full duplex, and correlated simplex messaging.

Method 200 includes an act of receiving a request from a client application via the first communication medium (act 203). For example, service network transport 153 can receive request 111 from computer system 101 via communication medium 113. Service network transport 153 can forward request 111 to service dispatcher 156. Method 200 includes an act of dispatching the request to the service application (act 204). For example, service dispatcher 156 can dispatch request 111 to service application 152.

Method 200 includes an act of generating an application response and one or more events in response to receiving the request, the application response including application data (act 205). For example, service application 152 can process request 111. From the processing of request 111, service application 152 can generate application response 1 14, including response data 116. The processing of request 111 can also cause events 117 to be generated. Events 117 can include exceptions or other ways of signaling that processing of request 111 may be a partial outcome.

Method 200 includes an act of sending the application response to the client application (act 206). For example, service application 152 can send application response 114, including response data 116, to client application 102. Method 200 includes an act of intercepting the application response (act 207). For example, service dispatcher 156 can intercept application response 114, including response data 116. Service dispatcher 156 can also access events 117.

Method 200 includes an act of constructing a transport-independent status for the application response based on an analysis of the application data and the one or more events (act 208). For example, service dispatcher 156 can construct protocol independent status 118 based on an analysis of response data 116 and events 117. Protocol independent status can include, for example, whether an error has occurred; the nature or kind of the error; the party responsible for causing the error; suggested remediating actions that may fix the error; user friendly expressions for indicating the error; and diagnostic or tracking information about the application system or request that led to the error.

In some embodiments, service dispatcher 156 expresses protocol independent status 118 in the form of assertions. Assertions can include individual statements referring to various different scopes. Each different scope can indicate something different about protocol independent status 118, such as, for example, (a) what went wrong (e.g., credentials were not valid, transmission error, etc.), (b) the module that caused things to go wrong, (c) what can be done to fix what went wrong (e.g., get a new token, use a different content encoding, use a different transfer encoding, contact a third party, reformulate request, etc.), and (d) a duration for which an indicated status is valid, etc.

An indicated duration for status validity can be an absolute time or time span. Alternately an indicated duration can be based on an event or action performed by the application. In some embodiments, the party that can fix an error is a third application (e.g., a token provider) different from the client or server application.

Service dispatcher 156 can pass response data 116 on to service network transport 153.

Method 200 includes an act of formulating protocol specific status renderings from the transport-independent status, the protocol specific status renderings including status indicators for a plurality of different protocol layers of a second communication medium (act 209). For example, service status processor 154 can formulate protocol specific status renderings 119 from protocol independent status 118. Protocol specific status renderings 119 can include status indicators for a plurality of protocol layers of communication medium 123 (e.g., HTTP, TCP, IP, etc).

In some embodiments, service status processor 154 consumes assertions used to express protocol independent status 118 when formulating protocol specific status renderings 119. Service status processor 154 can formulate a status indicator for each different protocol layer from the assertions in protocol independent status 118. Service status processor 154 can use the different scopes indicated in protocol independent status 118 (and can possibly refer to protocol capabilities in service configuration 136) to determine appropriate status indicators for the different protocol layers. A status indicator for a protocol layer can be based at least in part on how the capabilities of protocol layer can be used to express protocol independent status 118.

Service status processor 154 can send protocol specific status renderings 119 to service network transport 153.

Method 200 includes an act of sending the response to the client computer system via the second communication protocol, the response including the application data and the protocol specific status renderings such that the transport-independent status of the response can be indicated, at least to some extent, at each of the plurality of different protocol layers used by the second communication protocol (act 210). For example, service network transport 153 can combine protocol specific status renderings 119 along with response data 116 into response 121. Service network transport 153 can send response 121 to computer system 101 via communication medium 123. Protocol specific renderings 119 indicate protocol independent status 118, at least to some extent, at each protocol layer of communication medium 123.

Communication medium 123 can utilize any combination of a variety of different protocols, such as, for example, IP, TCP, UDP, HTTP, Hypertext Transfer Protocol over TLS ("HTTPS"), Simple Object Access Protocol ("SOAP"), etc., arranged in a protocol stack. Communication medium 123 can also utilize any of a variety of different message exchange patterns including, for example, half duplex, full duplex, and correlated simplex messaging. Communication medium 113 and communication medium 123 can be the same. Alternately, the protocols and/or the message exchange pattern of communication medium 123 can differ from that of communication medium 113.

Method 200 includes an act of receiving the response from the server computer system via the second communication medium(act 211). For example, client network transport 103 can receive response 121 via communication medium 123. Client network transport 103 can pass response data 116 onto client application 102. Client network transport 103 can also pass protocol specific status renderings 119 to client status processor 104.

Method 200 includes an act of synthesizing a single status response from the protocol specific status renderings, the single status response indicating an error condition with respect to the processing of the request at the server computer system (act 212). For example, client status processor 104 can synthesize status response 162 from protocol specific status renderings 119. Status response 162 can indicate an error that occurred in processing request 111 at computer system 151. Status response 162 can include one or more of: the nature or kind of the error; the party responsible for causing the error; suggested remediating actions that may fix the error; user friendly expressions for indicating the error; and diagnostic or tracking information about the application system or request that led to the error.

In some embodiments, a single status response reflects assertions expressed in protocol independent status 118. For example, status response 162 can indicate that a request (e.g., request 111) will continue to fail while the status (e.g., protocol independent status 118) is valid. Status response 162 can also indicate that the party that can fix an error is a party other than the client or the server.

Method 200 includes an act of automatically performing one or more remedial actions to compensate for the error condition subsequent to synthesizing the single status response so as to reduce further manually entered actions at the client application (act 213). For example, client status processor 104 can perform automated remedial action 126 to compensate for an error that occurred at computer system 151. Automated remedial action 126 can be expressly indicated by status response 162.

Expressly indicated remedial actions can indicate any of a variety of different actions. For example, status response 162 can expressly indicate that the remedial action is to wait a specified period of time before re-sending a request. Status response 162 can also expressly indicate that the remedial action is to contact a third party. Status response 162 can also expressly indicate that a request is to be re-encoded to use a different representation on a network (e.g., breaking a larger message into a number of smaller messages). Status response 162 can also expressly indicate that a request is to be re-formulated to change the semantics of the request. For example, a request can be formulated into one or more other requests because the original request was not understood by the system.

Alternately, automated remedial action 126 can be derived from other data in protocol specific status renderings 119. Client status processor 104 can consult client configuration 134 to obtain additional status related information. For example, client status processor 104 may consult client configuration 134 to obtain translated status strings to localize an expression into the user interface language of computer system 101.

Automated remedial actions can include re-sending a request, submitting additional authorization data, changing communication mediums, etc.

Client status process 104 can convert status response 162 into application formatted status 123. Application formatted status 123 is in an application-specific format compatible with client application 102. For example, status response 162 may indicate that "client 102 provided an invalid request due to missing authorization data". Client status processor 104 can translate this into an application-specific security exception. Client status processor 104 can send application formatted status 123 to client application 102. Client application 102 can then process response data 116 and application formatted status 123 in an application specific manner.

Accordingly, embodiments of the invention can be used to indicate a status with increased expressive power relative to the protocols used to transport a request and response. For example, HTTP can generate a 404 error in response to a request to a specified URI. However, HTTP can be ambiguous as the duration for which the 404 error is valid and provides limited and potentially ambiguous information about why a requested resource is not available. For example, a 404 can be issued because a resource that was previously there has been taken away for a known amount of time or that a resource hasn't yet been created.

The assertion language can be used to provide more expressive information, such as, for example, indicating that a collection of resources including a requested resource does not exist, how long until the resource is available, etc. Thus, the assertion language can be used to distinguish when a resource used to exist but no longer does from when a resource does not yet exist but will in the future. The assertion language can also be used to indicate appropriate remedial action for each situation. For example, when a resource is gone and not coming back, the assertion language can indicate a remedial action to reformulate a request. On the other hand, when a resource does not exist now but will in the future, the assertion language can indicate a remedial action of re-sending the request at a specified time in the future.

Accordingly, embodiments of the invention provide a mechanism for implementing a new protocol for performing resource request status updates that maintains the benefits of existing protocol (e.g., HTTP) conventions while being usable with arbitrary transport protocols. Additionally, the new protocol works with a variety of different message exchange patterns. The use of the protocol can be hidden behind a programming model that normalizes transport-specific resource status protocols, such as, for example, HTTP, with transport-independent resource status protocols, such as, for example, with a SOAP binding of the described protocol.

As such, embodiments of the invention provide resource status updates over an arbitrary network transport protocol whose format and message exchange pattern is decoupled from the definition of the application. Transport-native and transport-independent protocols for resource status can be canonicalized to remove special casing by higher level components. Portions of a resource status response can be handled by a transport-native protocol and the remainder of the resource status response can be handled by a transport-independent protocol.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a client application, a client network transport, and a client status processor, a method for taking action to attempt to satisfy a client request, the method comprising:

an act of the client application sending a request to a service application, the service application being located at a server computer system;

an act of the client network transport forwarding the request from the computer system to the server computer system via an outbound communication medium, the outbound communication medium utilizing a plurality of communication protocols arranged in a protocol stack;

an act of the client network transport receiving a response from the server computer system via an inbound communication medium, the inbound communication medium utilizing a second plurality of communication protocols arranged in a second protocol stack to communicate the response from the server computer system to the computer system, the response responsive to the request, the response including application data and protocol specific status renderings, the protocol specific status renderings including status indicators for each of the second plurality of communication protocols, the status indicators indicating an event condition related to processing the request at the server computer system, the protocol specific status renderings formulated from assertions expressed in a protocol independent status at the server computer system, the expressed assertions representing other status information for the event condition in addition to the protocol specific status renderings;

an act of the client status processor synthesizing a single status response from the protocol specific status renderings, the single status response identifying the event condition to the computer system, the single status response indicating one or more remedial actions to compensate for the event condition based on the other status information from the expressed assertions; and an act of the client status processor automatically performing the one or more remedial actions to compensate for the event condition so as to reduce further manually entered actions at the client application.

2. The method as recited in claim 1, wherein the act of the client network transport forwarding the request from the computer system to a server computer system via an outbound communication medium comprises an act of forwarding the request via a half duplex communication medium; and wherein the act of the client network transport receiving a response from the server computer system via an inbound communication medium comprises an act of receiving a response from a server via the same half duplex communication medium.

3. The method as recited in claim 1, wherein the act of the client network transport forwarding the request from the computer system to a server computer system via an outbound communication medium comprises an act of forwarding the request via one of: a half duplex communication medium, a full duplex communication medium, or a simplex communication medium; and wherein the act of the client network transport receiving a response from the server computer system via an inbound communication medium comprises an act of receiving a response from a server via the inbound communication medium with the same message exchange pattern as the outbound communication medium, the request and response messages correlated together.

4. The method as recited in claim 1, wherein the act of the client network transport forwarding the request from the computer system to a server computer system via an outbound communication medium comprises an act of forwarding the request via one of: a half duplex communication medium, a full duplex communication medium, or a simplex communication medium; and, wherein the act of the client network transport receiving a response from the server computer system via an inbound communication medium comprises an act of receiving a response from a server via the inbound communication medium with a different message exchange pattern than the outbound communication medium, the request and response messages correlated together.

5. The method as recited in claim 1, wherein the act of the client status processor synthesizing a single status response from the protocol specific status renderings comprises an act of synthesizing a single status response that indicates one or more of: whether an error has occurred, the nature or kind of the error, the party responsible for causing the error, suggested remediating actions that may fix the error, user friendly expressions for indicating the error, and diagnostic or tracking information about the application system or request that led to the error.

6. The method as recited in claim 5, wherein the single status response expressly indicates contacting a third different application as a remedial action.

7. The method as recited in claim 5, wherein the single status response expressly indicates that the status indicated in the single status response is valid for a limited duration.

8. The method as recited in claim 7, wherein the single status response expressly indicates a remedial action of waiting for the limited duration to expire.

9. The method as recited in claims 1, wherein the act of the client status processor automatically performing the one or more remedial actions to compensate for the event condition comprises an act of automatically performing one of: resending the request, submitting additional authorization data, changing communication mediums, contacting a third different application.

10. At a computer system including one or more processors and system memory, the computer system also including a service application, a service network transport, a service dispatcher, and a service status processor, a method for formulating a status response to a client application request, the method comprising:

an act of the service network transport receiving a request from a client application via an inbound communication medium, the client application being located at a client computer system, the inbound communication medium utilizing a plurality of communication protocols arranged in a protocol stack;

an act of the service dispatcher dispatching the request to the service application;

an act of the service application generating an application response and one or more events in response to receiving the request, the application response including application data;

an act of the service application sending the application response to the client application;

an act of the service dispatcher intercepting the application response;

an act of the service dispatcher constructing a transport-independent status for the application response based on an analysis of the application data and the one or more events, the transport-independent status expressing one or more protocol independent assertions with respect to an event condition at the service application;

an act of the service status processor consuming the one or more protocol independent assertions to formulate protocol specific status renderings from the transport-independent status, the protocol specific status renderings including status indicators for each of a second plurality of communication protocols in a second protocol stack utilized by an outbound communication medium; and an act of the server network transport sending a response from the computer system to the client computer system via the out bound communication medium, the response including the application data and the protocol specific status renderings such that the transport-independent status of the response can be at least partially indicated for each of the second plurality of communication protocols.

11. The method as recited in claim 10, wherein the act of the service network transport receiving a request from a client application via an inbound communication medium comprises an act of receiving the request via a half duplex communication medium; and, wherein the act of the service network transport sending a response to the client computer system via an outbound communication medium comprises an act of sending the response via the same half duplex communication medium.

12. The method as recited in claim 10, wherein the act of the service network transport receiving a request from a client application via an inbound communication medium comprises an act of receiving the request via one of: a half duplex communication medium, a full duplex communication medium, or a simplex communication medium; and, wherein the act of the service network transport sending a response to the client computer system via an outbound communication medium comprises an act of sending the response via the outbound communication medium with the same message exchange pattern as the inbound communication medium, the request and response messages correlated together.

13. The method as recited in claim 10, wherein the act of the service network transport receiving a request from a client application via an inbound communication medium comprises an act of receiving the request via one of: a half duplex communication medium, a full duplex communication medium, or a simplex communication medium; and, wherein the act of the service network transport sending a response to the client computer system via an outbound communication medium comprises an act of sending the response via the outbound communication medium with a different message exchange pattern than the inbound communication medium, the request and response messages correlated together.

14. The method as recited in claim 10, wherein the act of the service dispatcher constructing a transport-independent status for the application response comprises an act of expressing the transport-independent status in the form of assertions, each assertion including an individual statement indicating something about the transport independent status.

15. The method as recited in claim 10, wherein the second plurality of communication protocols includes Internet Protocol ("IP"), Transmission Control Protocol ("TCP"), and HyperText Transfer Protocol ("HTTP") arranged in the second protocol stack.

16. The method as recited in claim 10, wherein the one or more protocol independent assertions indicate that a third different application can fix an error.

17. The method as recited in claim 10, wherein the one or more protocol independent assertions indicate a duration for which the transport-independent status is valid.

18. The method as recited in claim 17, wherein the duration for which the transport-independent status is valid is one of: an absolute time, a relative time, or the future occurrence of a specified event.

19. A system for using transport-independent resource status, the system comprising:

a client computer system, the client computer system comprising:
  one or more processors;
  system memory; and
  one or more computer storage media having stored thereon computer-executable instructions representing a client application, a client status processor, and a client network transport; and a server computer system, the server computer system comprising:
  one or more processors;
  system memory; and
  one or more computer storage media having stored thereon computer-executable instructions representing a service application, a service status processor, a service dispatcher, and a client network transport; and wherein the client application is configured to:
  send a request to the service application;
  receive a response from the service application; and
  receive a formatted status from the client status processor;

wherein the client network transport is configured to:
  forward the request from the client computer system to the server computer system via a first communication medium, the first communication medium utilizing a plurality of communication protocols arranged in a protocol stack;

receive a response from the server computer system via a second communication medium, the second communication medium utilizing a second plurality of communication protocols arranged in a second protocol stack, the response responsive to the request, the response including application data and protocol specific status renderings, the protocol specific status renderings including status indicators for each of the second plurality of communication protocols, the status indicators indicating an event condition related to processing the request at the server computer system, the protocol specific status renderings formulated from assertions expressed in a protocol independent status at the server computer system, the expressed assertions representing other status information for the event condition in addition to the protocol specific status renderings; and forward the protocol specific status renderings to the client status processor;

wherein the client status processor is configured to:
receive the protocol specific status renderings from the client network transport;
synthesize a single status response from the protocol specific status renderings, the single status response identifying the event condition to the client computer system, the single status response indicating one or more remedial actions to compensate for the event conditions based on the other status information from the expression assertions; and
automatically perform the one or more remedial actions to compensate for the event condition so as to reduce further manually entered actions at the client application; and
send a formatted status to the client application;

wherein the service network transport is configured to:
receive the request from the client application via the first communication medium;
pass the request to the service dispatcher;
receive response data from the service dispatcher;
receive protocol specific status renderings from the service status processor, the protocol specific status renderings including status indicators for a plurality of different protocol layers of an out bound communication medium from the computer system to the client computer system; and
send the response from the server computer system to the client computer system via the second communication medium, the response including the application data and the protocol specific status renderings such that the transport-independent status of the response can be at least partially indicated, at each of the plurality of different protocol layers used by the outbound communication medium;

wherein the service application is configured to:
receive the request from the service dispatcher;
generate an application response and one or more events in response to receiving the request, the application response including application data; and
send the application response to the client application;

wherein the service dispatcher is configured to:
dispatch the request to the service application;
intercept the application response from the service application;
forward the application data to the service network transport;
construct a transport-independent status for the application response based on an analysis of the response data and the one or more events, the transport independent status expressing one or more protocol independent assertions for the event condition; and
forward the transport-independent status to the service status processor;

wherein the service status processor is configured to:
receive the transport-independent status from the service dispatcher;
consume the one or more protocol independent assertions to formulate the protocol specific status renderings from the transport- independent status; and
forward the protocol specific status renderings to the service network transport.

20. The system for using transport-independent resource status as recited in claim 19, wherein the first communication medium and the second communication medium have different message exchange patterns.

* * * * *